(12) United States Patent
Auvinen

(10) Patent No.: US 12,134,383 B2
(45) Date of Patent: Nov. 5, 2024

(54) BRAKING CONTROL ARRANGEMENT FOR A BRAKING SYSTEM OF A VEHICLE

(71) Applicant: Jukka Auvinen, Vääksy (FI)

(72) Inventor: Jukka Auvinen, Vääksy (FI)

( * ) Notice: Subject to any disclaimer, the term of this patent is extended or adjusted under 35 U.S.C. 154(b) by 385 days.

(21) Appl. No.: 17/619,197

(22) PCT Filed: Jun. 22, 2020

(86) PCT No.: PCT/FI2020/050442
§ 371 (c)(1),
(2) Date: Dec. 14, 2021

(87) PCT Pub. No.: WO2020/260758
PCT Pub. Date: Dec. 30, 2020

(65) Prior Publication Data
US 2022/0314998 A1 Oct. 6, 2022

(30) Foreign Application Priority Data

Jun. 27, 2019 (WO) .................. PCT/FI2019/050504

(51) Int. Cl.
*B60W 30/18* (2012.01)
*B60T 1/00* (2006.01)
*B60W 10/11* (2012.01)
*B60W 20/30* (2016.01)

(52) U.S. Cl.
CPC ...... *B60W 30/18136* (2013.01); *B60W 10/11* (2013.01); *B60W 20/30* (2013.01);
(Continued)

(58) Field of Classification Search
CPC .......... B60W 30/18136; B60W 10/11; B60W 20/30; B60W 2510/1005; B60W 2510/1045; B60W 2520/10; B60W 2520/14; B60W 2540/18; B60W 2552/40; B60W 2710/1005; B60W 2710/1044;
(Continued)

(56) References Cited

U.S. PATENT DOCUMENTS

| 4,276,972 A | 7/1981 | Burnett et al. |
| 4,562,894 A * | 1/1986 | Yang .................... B60C 29/007 180/65.24 |

(Continued)

FOREIGN PATENT DOCUMENTS

| EP | 0795700 A2 | 9/1997 |
| EP | 1093986 A2 | 4/2001 |

(Continued)

*Primary Examiner* — Yonel Beaulieu
(74) *Attorney, Agent, or Firm* — Muncy, Geissler, Olds & Lowe, P.C.

(57) ABSTRACT

A braking control arrangement is for a braking system of a vehicle. The braking system comprises an anti-lock braking system, ABS, and an electronic stability control, ESC. The braking control arrangement comprises a module that is arranged to operate with the anti-lock braking system and the electric stability control. The arrangement is also arranged to drive a gear arrangement of the vehicle in such a way that when braking the vehicle, the anti-lock braking system works, and a slippery road is detected, the gear arrangement of the vehicle is driven to shift a reverse gear.

16 Claims, 7 Drawing Sheets

Figure 1:
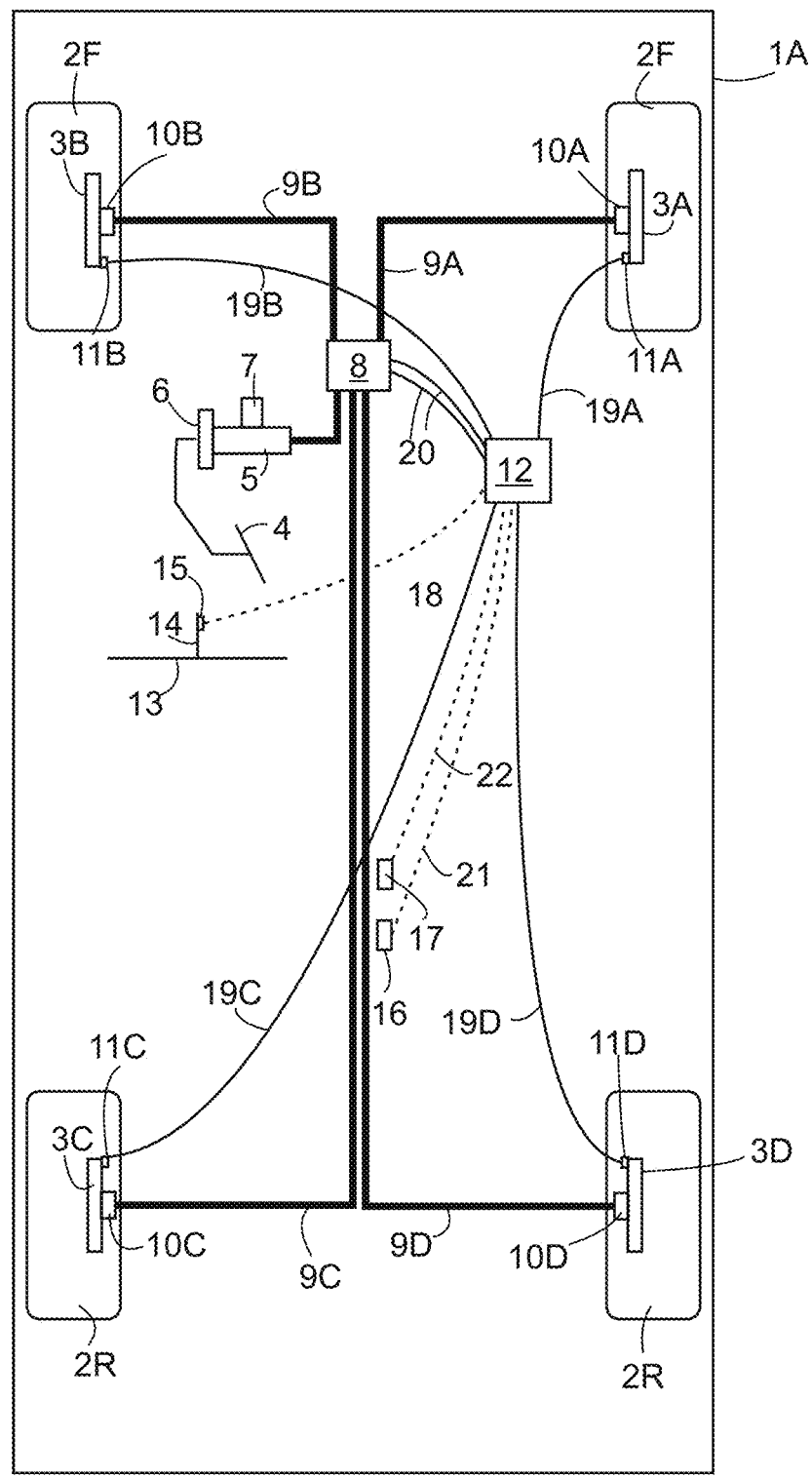

(52) U.S. Cl.
CPC .............. *B60W 2510/1005* (2013.01); *B60W 2510/1045* (2013.01); *B60W 2520/10* (2013.01); *B60W 2520/14* (2013.01); *B60W 2540/18* (2013.01); *B60W 2552/40* (2020.02); *B60W 2710/1005* (2013.01); *B60W 2710/1044* (2013.01)

(58) Field of Classification Search
CPC .... B60W 10/184; B60T 1/062; B60T 8/3215; B60T 2260/04; B60T 2260/09
See application file for complete search history.

(56) References Cited

U.S. PATENT DOCUMENTS

| | | | | |
|---|---|---|---|---|
| 4,787,491 | A | * | 11/1988 | Kato ........................ F16D 41/08 180/250 |
| 7,122,979 | B2 | * | 10/2006 | Wilton .................. B60L 3/0046 318/434 |
| 9,790,910 | B2 | * | 10/2017 | Quinteros ............... F16H 63/50 |
| 11,338,790 | B2 | * | 5/2022 | Tabata .................... B60K 6/387 |
| 11,912,140 | B2 | * | 2/2024 | Bernatchez ............... B60L 3/12 |
| 2004/0207350 | A1 | * | 10/2004 | Wilton .................... B60L 3/102 318/376 |
| 2009/0145674 | A1 | * | 6/2009 | Lee ......................... B60L 50/16 333/182 |
| 2011/0195699 | A1 | * | 8/2011 | Tadayon .................. H04B 5/77 455/418 |
| 2020/0070663 | A1 | * | 3/2020 | Lahner ..................... B60L 7/26 |
| 2021/0086747 | A1 | * | 3/2021 | Tabata .................. B60W 10/08 |

FOREIGN PATENT DOCUMENTS

| | | | | |
|---|---|---|---|---|
| EP | 4273972 | A2 | * 11/2023 | ............ H01M 12/08 |
| GB | 2321535 | A | 7/1998 | |

* cited by examiner

BRAKING CONTROL ARRANGEMENT FOR A BRAKING SYSTEM OF A VEHICLE

FIELD OF TECHNOLOGY

The invention relates to a braking control arrangement for a braking system of a vehicle. The braking system comprises an anti-lock braking system and an electronic stability control.

PRIOR ART

The brakes of the vehicle area used for decelerating the speed of the vehicle or to stop the vehicle. Nowadays braking systems of vehicles comprises anti-lock braking systems, i.e. ABSs and electronic stability controls, i.e. ESCs. Other abbreviations or names are also used, mostly depending on manufacture specific product names.

In order to prevent skidding of the vehicles wheels while braking the anti-lock braking system, ABS, has been developed. The ABS avoids locking up the wheel during braking. The locking up means that the wheel does not rotate. The ABS reduces and increases the brake pressure repeatedly, even about 15-20 times per second. In this way the wheels do not lock up and the steering control of the vehicle remains. Especially at high speed the ABS provider better stability and control of the vehicle, maintaining traction with a road surface.

In general, the ABS decreases stopping distances on dry surfaces. However, on slippery surfaces like loose gravel or snowy surface the ABS may significantly increase braking distances, but still remaining or improving the steering control.

The electronic stability control, ESC, improves the vehicles stability by detecting and reducing skidding i.e. loss of traction. When the skidding and loss of steering control is detected by the ESC, the brakes are automatically utilized in order to help the steering of the vehicle. Braking is wheel specific, for example if the vehicles rear starts to skid when driving in a curve, the ESC brakes the outer front wheel.

GB 2 321 535 discloses a known braking control arrangement for a braking system of a vehicle having an anti-lock braking system and an electronic stability control system.

Although, the ABS and ESC works generally fine, slippery roads may still cause problems, which may be fatal. For example when driving on loose gravel and a sudden obstacle becomes in front of the vehicle and there is no space to steer pass the obstacle the ABS may actually make the situation worse, because it increases a braking distance.

SHORT DESCRIPTION

The object of the invention is to alleviate or even eliminate the problems said above. The object is achieved in a way described in the independent claims. Dependent claims illustrate different embodiments of the invention.

A braking control arrangement according to the invention is for a braking system of a vehicle, which braking system comprises an anti-lock braking system, ABS, and an electronic stability control, ESC. The braking control arrangement comprises a module that is arranged to operate with the anti-lock braking system and the electric stability control. The arrangement is also arranged to drive the vehicle in such a way that when braking the vehicle, the anti-lock braking system works, and a slippery road is detected, the vehicle is driven to shift a reverse mode.

And when being in reverse during the braking, and an unwanted trace of the vehicle or a turn of the vehicle's steering wheel is detected, the vehicle is driven to shift from the reverse mode to a forward mode utilizing speed measurement data of the vehicle.

In more detail, the arrangement is arranged to drive a gear arrangement of the vehicle in such a way that when braking the vehicle, the anti-lock braking system works, and a slippery road is detected, the gear arrangement of the vehicle is driven to shift a reverse gear. And when being in reverse gear during the braking, and an unwanted trace of the vehicle or a turn of the vehicle's steering wheel is detected, the gear arrangement of the vehicle is driven to shift from the reverse gear to a forward gear utilizing speed measurement data of the vehicle.

In case the vehicle is an electric without gears, the arrangement is arranged to drive an inverter/s or a motor switch unit/s of the vehicle in such a way that when braking the vehicle, the anti-lock braking system works, and a slippery road is detected, the inverter/s or the motor switch unit/s of the vehicle is driven to shift a reverse mode. And when being in reverse mode during the braking, and an unwanted trace of the vehicle or a turn of the vehicle's steering wheel is detected, the inverter/s or a motor switch unit/s of the vehicle is driven to shift from the reverse mode to a forward mode utilizing speed measurement data of the vehicle.

LIST OF FIGURES

Figure 2:
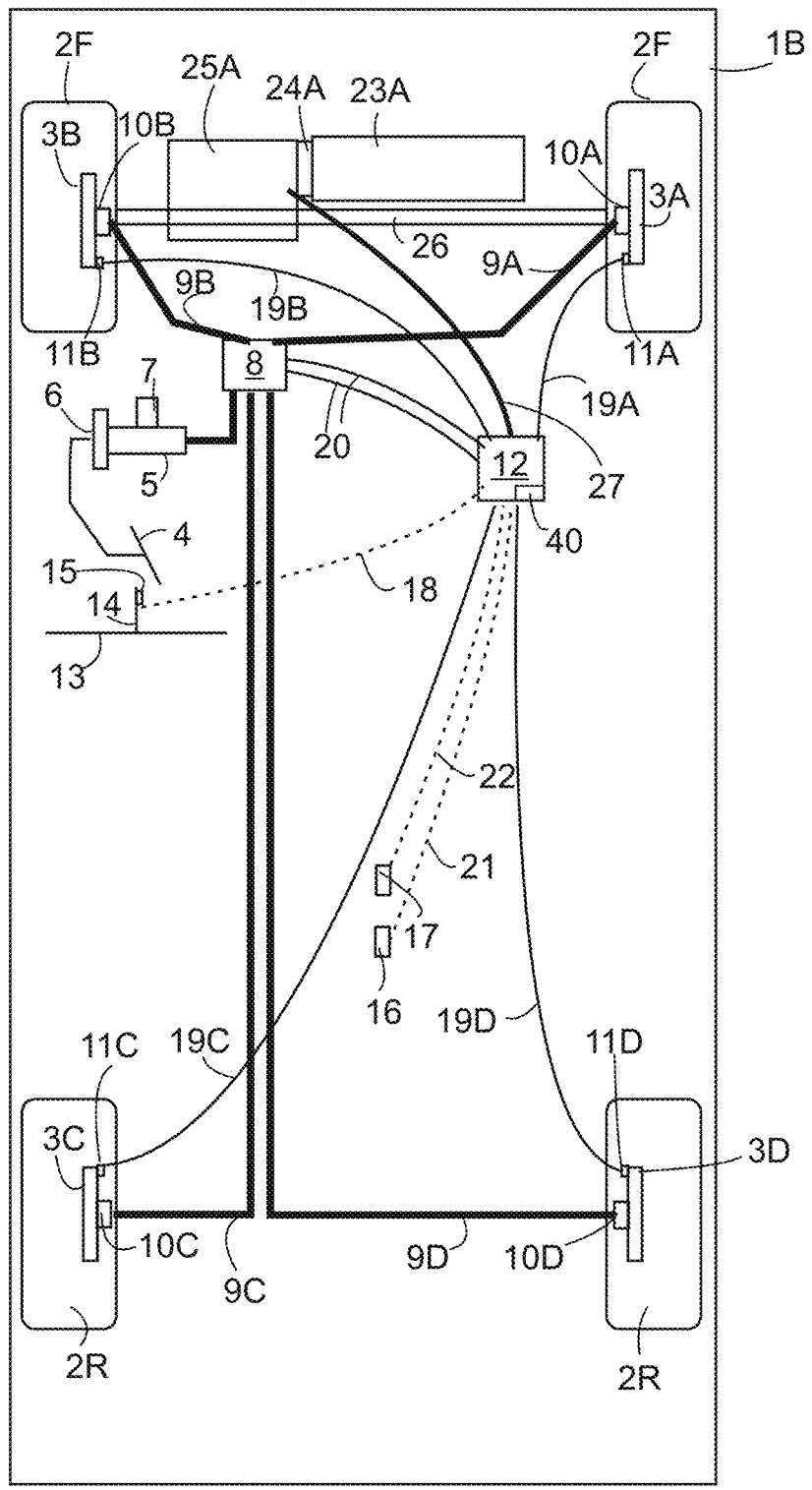
Figure 3:
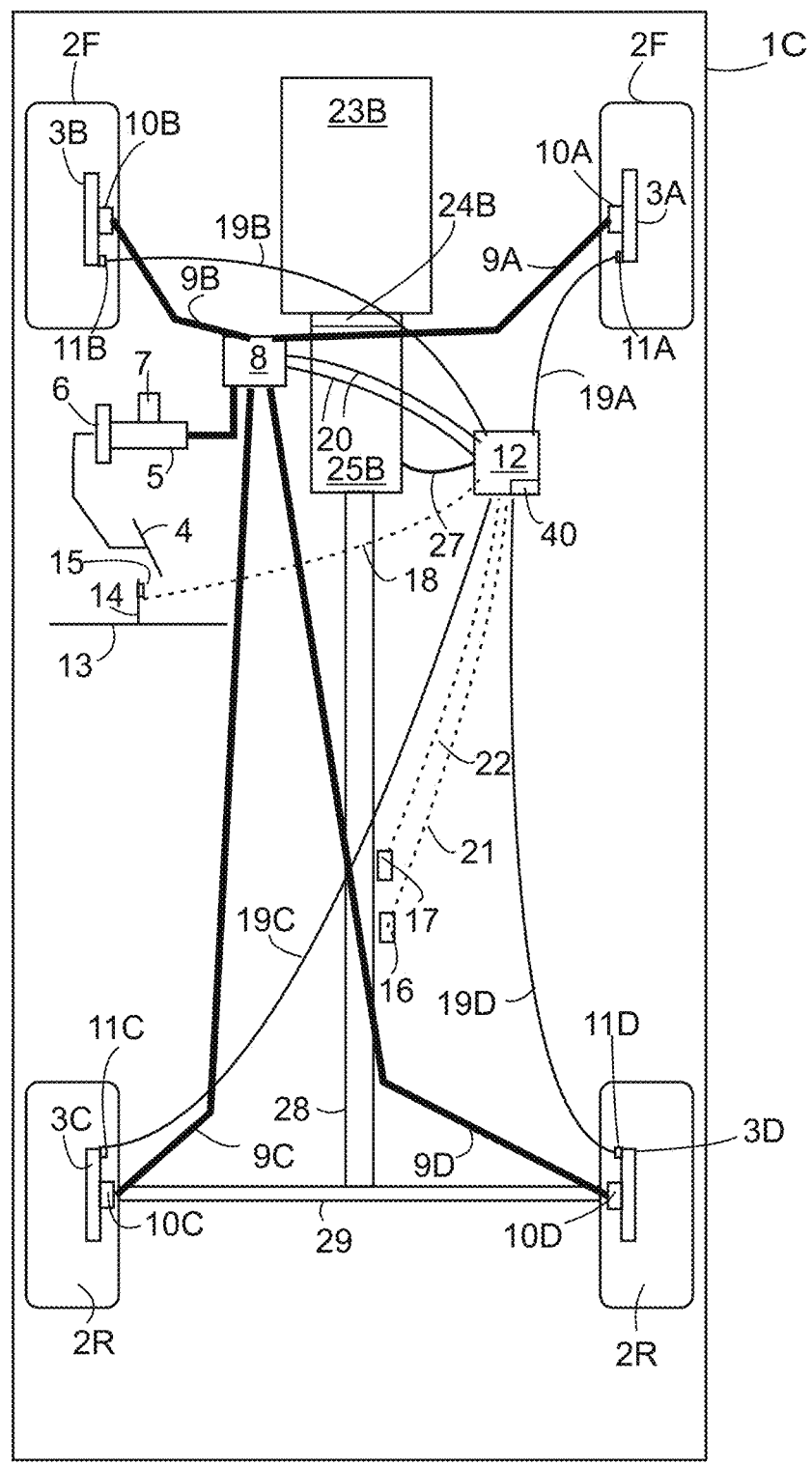
Figure 4:
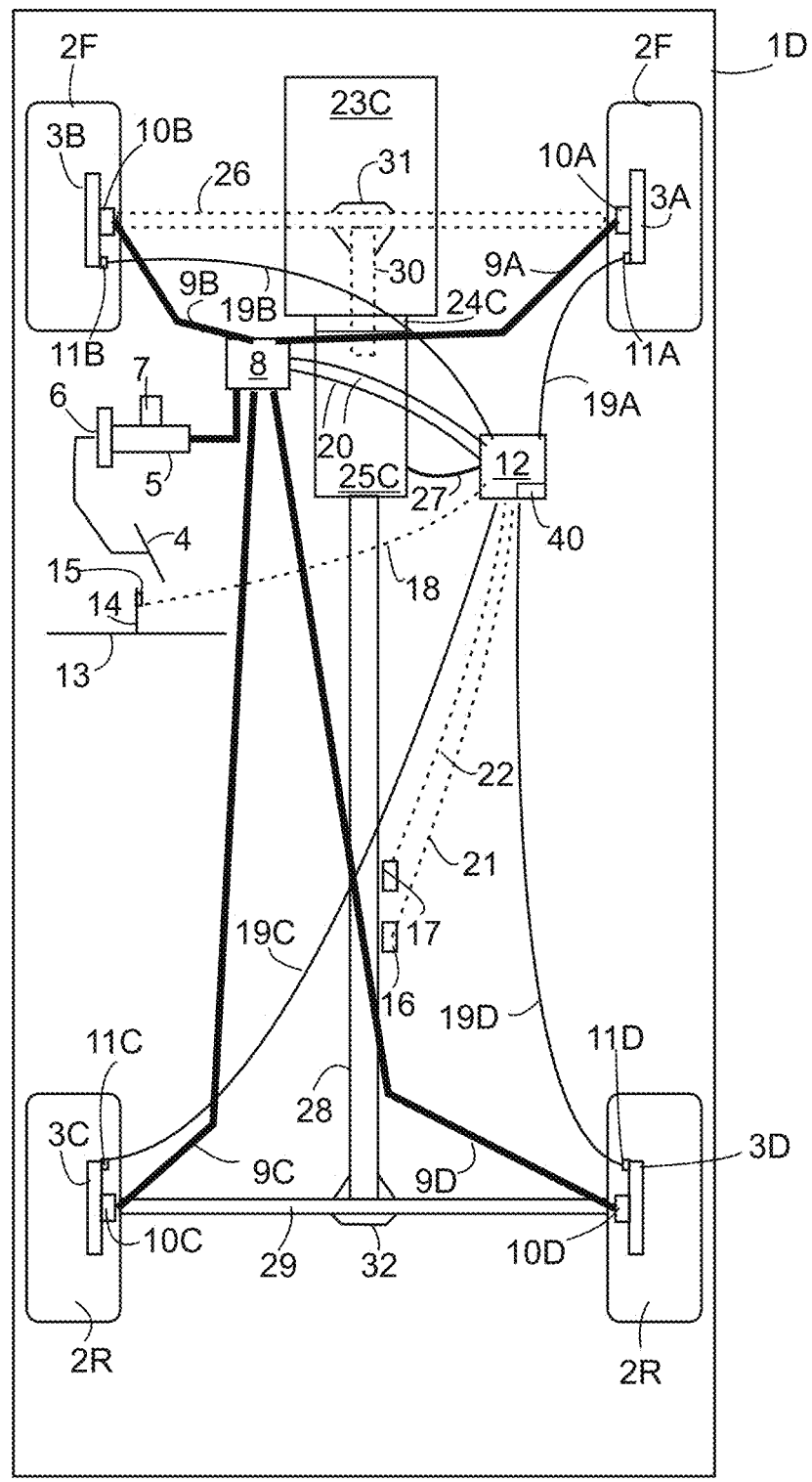
Figure 5:
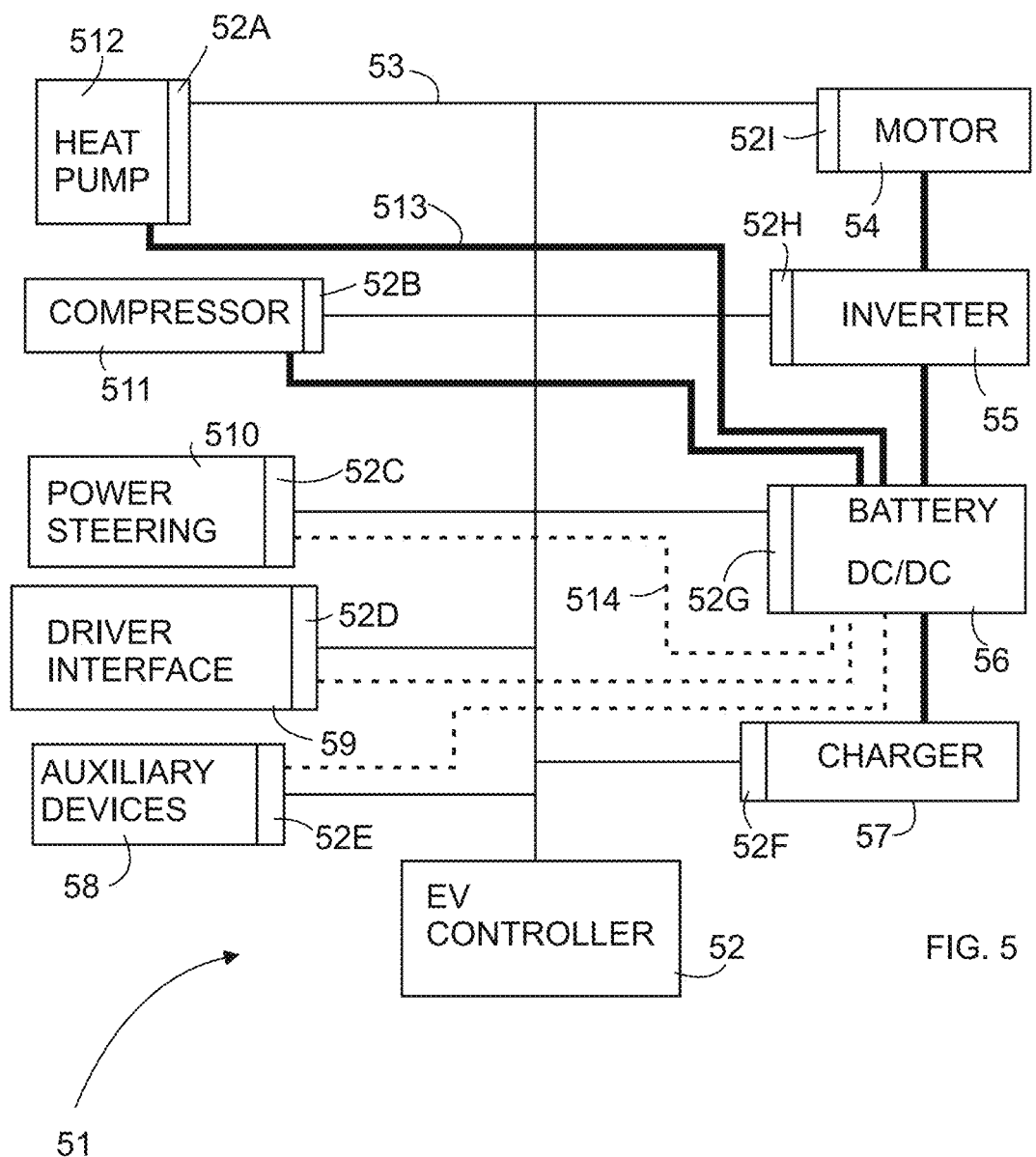
Figure 6:
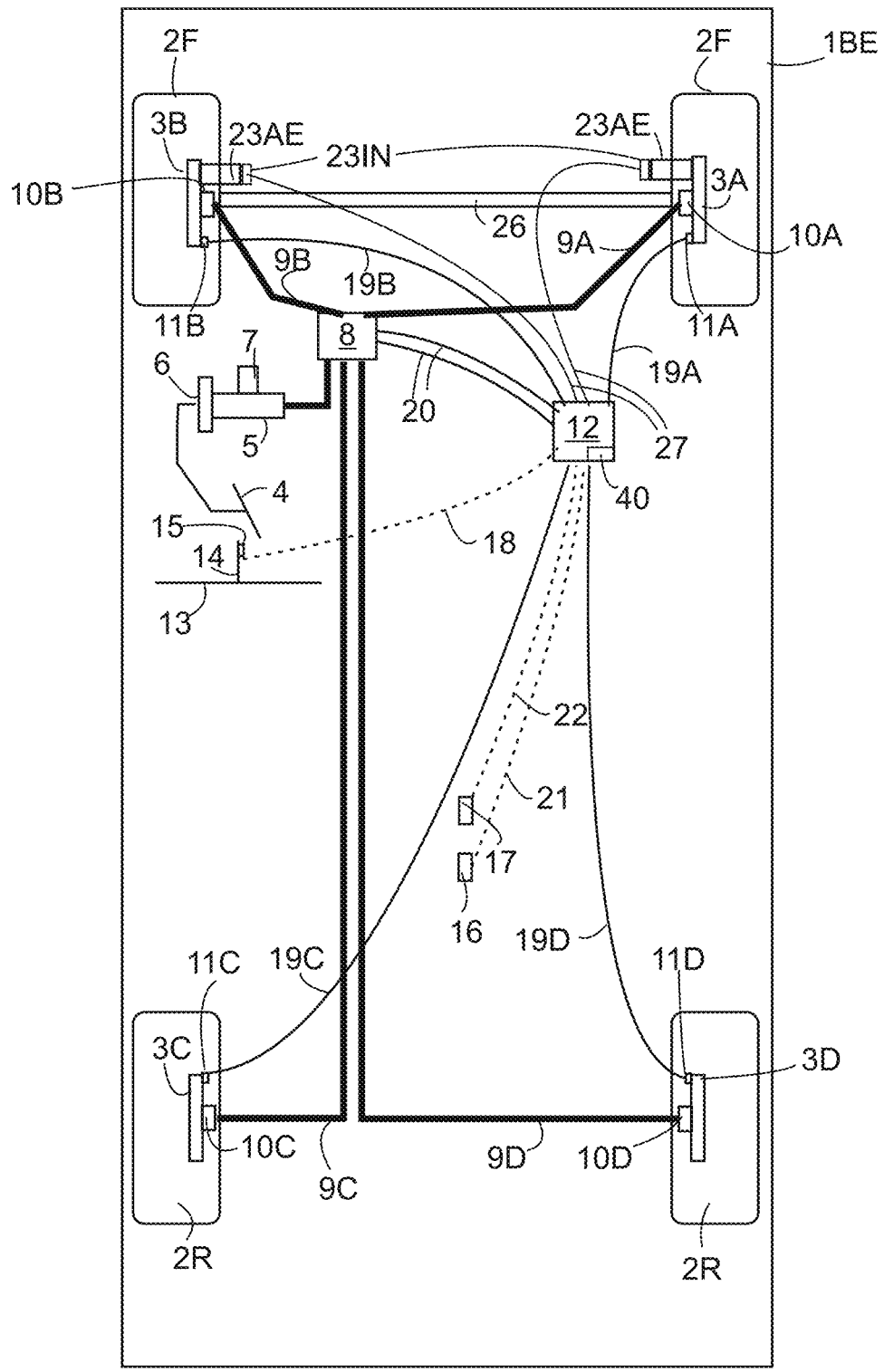
Figure 7:
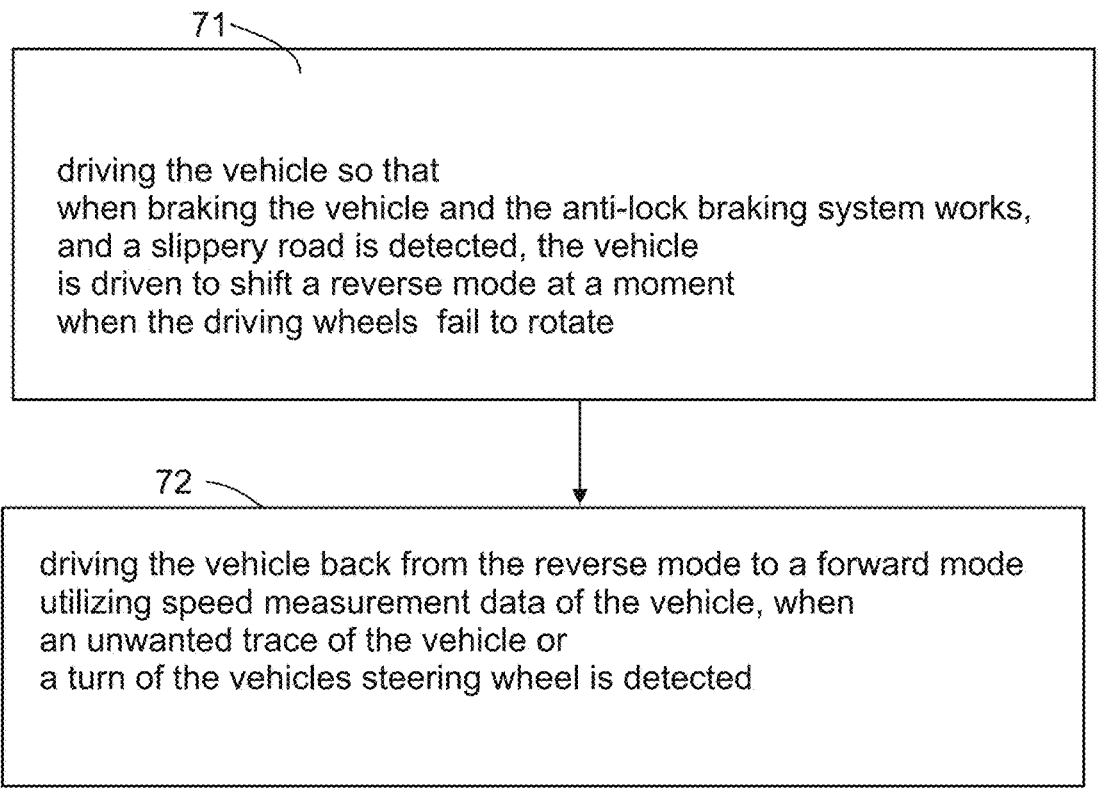
Figure 8:
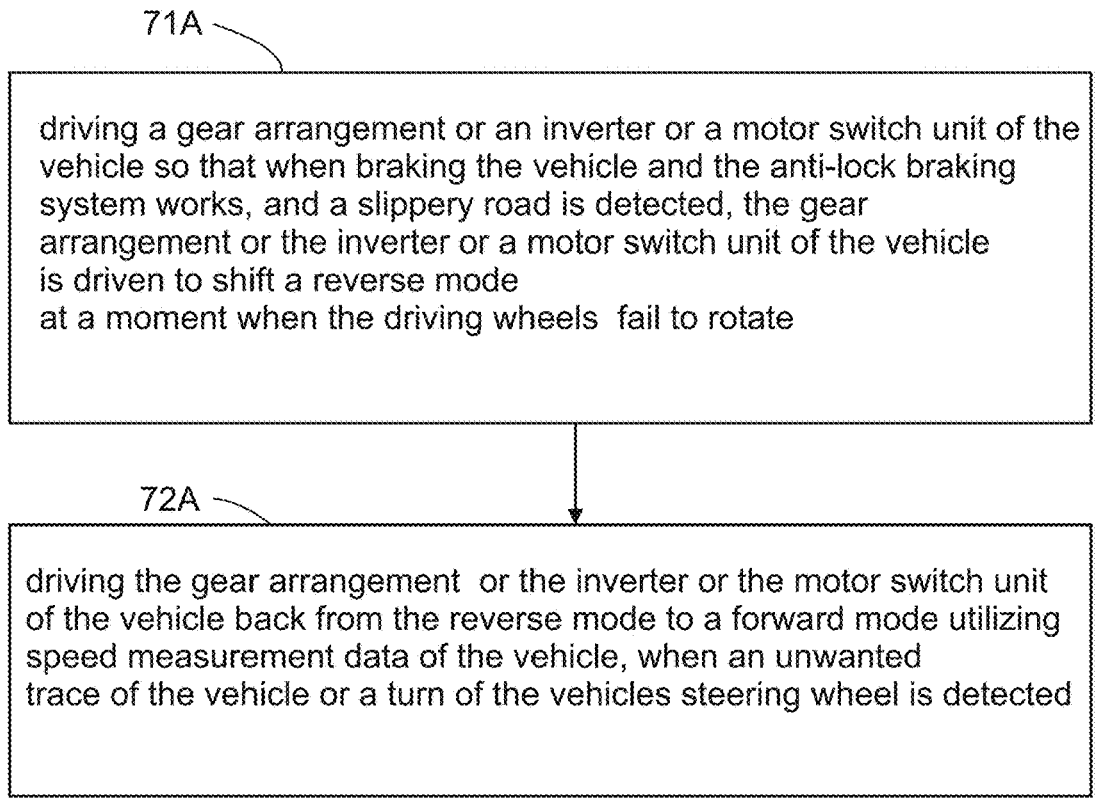

In the following, the invention is described in more detail by reference to the enclosed drawings, where FIG. 1 illustrates an example of a known ABS/ESC system, FIG. 2 illustrates an example of the invention with a front wheel drive car, FIG. 3 illustrates an example of the invention with a rear wheel drive car, FIG. 4 illustrates an example the invention with a four wheel drive car, FIG. 5 illustrates a an example of a control system of an electric car, FIG. 6 illustrates an example of the invention with the electric car, FIG. 7 illustrates a flow chart example of the method according to the invention, and FIG. 8 illustrates a flow chart example of the method according to the invention in more detail.

DESCRIPTION OF THE INVENTION

FIG. 1 illustrates an example of a known ABS/ESC system. A vehicle 1A has front wheels 2F and rear wheels 2R, which each wheel is equipped with a brake 3A, 3B, 3C, 3D. A brake pedal 4 is used by a driver when braking. The brake pedal is connected to a master cylinder 5 through a power booster 6 like a vacuum power booster. A brake fluid reservoir 7 is also connected with the master cylinder 5. The master cylinder is in turn connected via a brake fluid pipe to a modulator unit 8. The modulator unit 8 comprises valves, conveniently for each brake 3A, 3B, 3C, 3D of the wheel, and a pump in order to restore the fluid pressure to the brakes after the valves have released. The brake fluid is in connection with the brake cylinders 10A, 10B, 10C, 10D through brake lines 9A, 9B, 9C, 9D. Some systems may use valves having three positions. When the valve is open, the fluid pressure from the master cylinder is passed through to the brake. When the valve is closed, the brake is isolated from the master cylinder preventing the pressure rise in the brake cylinder. In third position, the valve releases some of the pressure from the brake. The pump is used to restore the fluid pressure.

The system comprises also a control module 12 that is often an integrated module has the ABS and ESC system control. Each wheel has a speed sensor 11A, 11B, 11C, 11D, in order to measure speed of the wheel. The speed sensors are connected to the control module through lines 19A, 19B, 19C, 19D. The control module is also connected 20 to the modulator unit 8 for controlling the valves and the pump. The speed sensors and the connections 20 to the modulator unit are elements needed for the ABS. It should be noted that FIG. 1 and the other figures of this description are simplified schematic drawings, so the ABS and the ESC may comprise other sensors and elements not shown in the figures. The dashed lines 18, 21, 22 illustrate connections to steering wheel angle position sensor 15 connected to a steering rod 14, a yaw rate sensor 16 and a lateral acceleration sensor 17. These sensors are used by the ESC. It is worth noting that the ESC also utilizes the speed sensors and the connections 20 to the modulator unit. As can be seen the steering rod 14 is connected with the steering wheel 13. The elements and functions of the example of FIG. 1 are known as such.

FIGS. 2, 3 and 4 show vehicles 1B, 1C, 1D having front wheel drive, rear wheel drive and four wheel drive. FIGS. 2-4 show the embodiments where the vehicle has a gear arrangement. The motor of these embodiments can be a combustion engine or an electric motor. Each figure shows a motor 23A, 23B, 23C that is connected to a gear arrangement 25A, 25B, 25C of the vehicle. The connection is usually through a clutch 24A, 24B, 24C. The gear arrangement can be a transmission, like automatic transmission. If the vehicle 1B, 1C, 1D is an electric vehicle, the gear arrangement is a gear system of the electric vehicle. The electric car may have a simple gear but transmission similar with combustion engines may also be used.

The vehicles with the gear arrangement are described first in this description. The electric vehicles without gears/transmission are described later. However, in this phase it is worth to mention that the functions described for the vehicles with the gear arrangement apply also to the electric vehicles without gears/transmission.

FIG. 2 shows the front wheel drive car 1B. For simplicity reasons wheel axles are illustrated as one axle 26. The front differential gear is not illustrated as well. The transmission 25A is connected to drive shaft not shown in FIG. 2. The drive shaft in turn is connected to the differential gear that is connection with the wheel axles. A skilled person understand that the wheel axles, differential gears and drive shafts are known elements of the vehicle.

So, the inventive braking control arrangement is for a braking system of a vehicle, wherein the braking system comprising an anti-lock braking system, ABS, and an electronic stability control ESC. The braking control arrangement comprises a module 40 that is arranged to operate with the anti-lock braking system and the electric stability control. The arrangement is also arranged to drive a gear arrangement 25A, 25B, 25C of the vehicle 1B, 1C, 1C in such a way that when braking the vehicle and the anti-lock braking system works, and a slippery road is detected, the gear arrangement of the vehicle is driven to shift a reverse gear. Further, when being in reverse gear during braking, and an unwanted trace of the vehicle or a turn of the vehicle's steering wheel is detected, the gear arrangement of the vehicle is driven to shift from the reverse gear to a forward gear utilizing speed measurement data of the vehicle. As can seen in FIG. 2, the module 40 can be integrated with the control module 12, that is also connected to the transmission 25A, i.e. the gear arrangement, in order to make the gear shifts.

It is noted that the driver of the vehicle determines the trace of vehicle by using the steering wheel, in other words a wanted trace of the vehicle depends on the driver and the turning angle of the steering wheel, whereto the vehicle is directed to move. The trace of the vehicle, which is different than the wanted trace is an unwanted trace of the vehicle. The unwanted trace can be detected by utilizing different sensors. The unwanted trace may, for example, be caused by a slippery or uneven surface of a road.

The invention works also with the rear wheel drive vehicle 1C having a rear drive shaft 28 to rear wheel axles 29. Further the invention works also with the four wheel drive vehicle 1D having a rear drive shaft 28 to the rear wheel axles 29, and a front drive shaft 30 to the front wheel axles 26. FIG. 4 showing the example of the four wheel drive illustrates also front and rear differential gears 31, 32.

The module can be software or an integrated circuit module. The integrated circuit module can, for example, be an ASIC (Application Specific Integrated Circuit) or SoC (System on a Chip). As said, it is convenient and practical to install the module with the control module containing the ABS and ESC systems. However, the module may also be installed in a different way if desired.

The slippery road is detected by utilizing temperature measurement data and deceleration data of the vehicle. The vehicle has many sensors like temperature sensor to measure weather temperature, a lateral acceleration sensor and a longitudinal acceleration sensor. The longitudinal acceleration sensor can be used for measuring the deceleration of the vehicle in the direction of the vehicles trace if a separate deceleration sensor is not useable.

So, it is worth to note that module 40 (and the control module also in many embodiments) is in connection with sensor data of a number of different sensors. All possible and useable sensors are not illustrated in this description, but it is clear for a skilled person that a vehicle contains many different measurement sensors that the invention can utilize. For example, the braking control arrangement may utilize measurement data from a temperature sensor, speed measurement sensors, a steering wheel angle sensor, a yaw rate sensor, a lateral acceleration sensor and a longitudinal acceleration sensor.

So if the temperature measurement data for weather is below a threshold temperature and the deceleration data of the vehicle reveals that the deceleration of the vehicle, in the direction of the vehicles trace/course, is too low, the slippery road is detected. The evaluation of whether the road surface is slippery or not, can be made by deducing the road surface from the measurements. For example, if there is warm weather and not raining, an asphalt surface provides a good traction with the wheels in this weather condition. A concrete surface provides even better traction. The traction on a warm dry asphalt is so good that it has been considered unnecessary to improve the actions of the vehicles braking system by the invention. The threshold temperature can be selected to be desired, for example 5 Celsius or another value. If the temperature is below the threshold temperature, the weather is considered to be cold in which case even the dry asphalt (or concrete) can be slippery, and the invention can act to improve the braking. Different road surfaces affect the deceleration of the vehicle. The module 40 can have deceleration data relating to different road surfaces and weather conditions. Therefore, the slippery driving condition can be deduced from the deceleration measurement of the vehicle and from the weather temperature measurements of the vehicle. Cold weather is considered to be more slippery to drive a car than a warm weather. A wet asphalt, for example due to raining, is considered to be slippery. A loose gravel or a snowy road surface are considered to be slippery to drive the vehicle.

Another way to detected the slippery road is to utilize temperature measurement data and a camera data of the roads surface, so that if the temperature measurement data is below a threshold temperature and the camera data provides another data than a dry asphalt surface, the slippery road is detected. Nowadays it is common that the vehicles are equipped with several cameras. At least one camera can film or photograph the road surface from which the roads surface can be detected. In these embodiments the camera/s is connected to the module 40 and/or the control module 12.

The gear arrangement of the vehicle, like an automatic transmission for a combustion engine or a gear system for the electric motor of the electric vehicle or other suitable gear system or transmission, is driven to shift a reverse gear. The transmission/gear system has actuator/s to shift a right gear. Normally as known, the right gear depends on the speed of the vehicle. The actuator/s also shift to reverse gear when controlled by the driver. The invention utilizes known structures and actuators of known transmissions and gear systems in order to shift reverse gear and away from reverse gear to a forward gear. Shifting back to a right forward gear depends on the current speed of the vehicle.

It has been found that when braking on a slippery road, shifting reverse gear can decrease braking distance significantly. Since vehicles may have a system to block shifting reverse when driving forward, the invention is arranged to override this block. Nowadays transmissions and gear arrangement and drive shafts etc. may carry relatively high torques, so shifting reverse gear has been found possible. So when braking the ABS works, but if the slippery road is detected, the gear arrangement of the vehicle can be driven to shift a reverse gear in order to decrease breaking distance. In this way a collision to an obstacle on a road can be avoided if steering the vehicle pass the obstacle is not possible.

In addition the inventive arrangement is also arranged to drive a gear arrangement of the vehicle in such a way that when the electronic stability control works, ESC in order to correct skidding, the gear arrangement of the vehicle is driven to shift a reverse gear in order to improve the correction of the skidding. As said, a steering wheel angle sensor 15, a yaw rate sensor 16, a lateral acceleration sensor 17 and a longitudinal acceleration sensor (not shown in the figures) may be used.

As said above, the inventive arrangement can be used in the vehicles where the vehicle has a gear arrangement. The motor of these vehicle can be a combustion engine or an electric motor. Any case the inventive arrangement can also be used in electric vehicles where the vehicle has not a gear arrangement. Functions of the inventive arrangement described above apply to these electric vehicles as well.

It is clear that the electric car without the gear/transmission has mostly the same parts, which were described above like the wheels, steering wheel, brake pedal, brake fluid reservoirs etc. The differences are mainly related to a power line from the motor to the wheel or wheels in this context. It must be remembered that the electric vehicle can have the gear/transmission as well. FIG. 5 shows a simplified figure of the control system 51 of the electric vehicle. It is worth mentioning that there are other ways to arrange the control of the electric vehicle as described in FIG. 5.

The embodiment of FIG. 5 has an EV controller 52, which is in connection to other controllers and sensors 52A, 52B, 52C, 52D, 52E, 52F, 52G, 52H, 52I through a CAN bus 53. CAN, Controller Area Network, is a communication network between the devices and controllers. So, the parts of the vehicle, which are controlled are connected to the CAN bus. The embodiment of figure shows that the motor 54, the inverter 55, the battery 56, the charger 57, the heat pump 512, the compressor 511 the power steering 510, the driver interface 59 and other possible devices 58 are connecter to the CAN via the controllers and/or sensors.

The battery 56 is the power source of the vehicle. It can be charged through a charger 57 or by the inverter 55 in cases when the motor 54 works like a generator (braking situations for example). Power is distributed from the battery to the devices either using low voltage lines 514 or high voltage lines 513. The low voltage lines are marked as dashed lines. The high voltage lines are marked as thick lines.

The inverter 55 turns direct current (for example 400 V from the battery 56 into a modulated AC current or DC current if the DC current is needed in lower voltage level. The controller 52H or the microcomputer of the inverter 55 can change very accurately speed of the motor 52I. In addition, the controller or the microcomputer can also change the rotational direction of the electric motor. Therefore, reverse gear may not be needed. By controlling the inverter to motor can be driven to run forward, or backward i.e. to reverse. It is worth to note that the gear arrangement mentioned above has a forward mode and a reverse mode (at least one gear to forward and a reverse gear), and the electric vehicle without the gear arrangement usually has a fixed reduction gearbox for single forward transmission, but no reverse gear. Further, instead of using the inverter 55 for changing the rotation direction of the electric motor from forward to backward or vice versa, there can be a motor switch unit for doing these action i.e. changing the rotation direction of the electric motor from forward to backward or vice versa. This can made by switching the phases of voltage lines into to a different order. The voltage lines are the lines, which supply power to the electric motor. Depending on a number of the electric motors, there can be several inverters or the motor switch units.

As can be seen in the figures the control units can be arranged and/or named in different ways. As said, FIG. 5 is the simplified drawing. The braking control system can be a separate system 58, or a part of the power steering 510, or a part of the main controller 52. A real structure depends on a manufacture. Regarding the invention the module 40 can be situated in any suitable location of the electric vehicle. The module can be software or an integrated circuit module, FIG. 6 shows a simplified example of the electric car with two electric motors 23AE with the front wheels 2F. It is worth of mentioning that it is also possible that the electric motors are situated into the rear wheels, or into the all wheels, the electric vehicle may also have one electric motor. FIG. 6 is for illustrating the braking control arrangement, so the electric car of the figure has the corresponding system of FIG. 5, although not seen in FIG. 6. The inverters 23IN of the motors 23AE are controlled in the embodiment of FIG. 6 (and other possible embodiments) for changing the rotation directions of the motors, in other words changing from the forward direction (forward mode) to the backward direction (reverse mode). The motor running to backward direction means reversing. It is worth to note, that in this description the forward mode means that some or all wheels of a vehicle (at least one wheel in case where each wheel can be driven separately) can be driven to rotate to forward direction in order to move the vehicle forward. The vehicle may have the gear arrangement or not (in case of some electric vehicles). Correspondingly, the reverse mode means that the wheels of vehicle (or in case where each wheel or a part of the wheels can be driven separately) can be driven to rotate to backward direction in order to move the vehicle in reverse/backward. The vehicle may have a reverse gear or not (in case of some electric vehicles).

As said above, there can be the electric motors in the all wheels. In this case, each wheel can be drive separately to the reverse mode and to the forward mode. In some driving conditions this wheel specific control can provide excellent improvement when compared to known solutions.

In the electric vehicle without the gears/transmission (without the reverse gear), the braking control arrangement is arranged to drive an inverter/s 55 or a motor switch unit/s of the vehicle (not shown in the figures) in such a way that when braking the vehicle and the anti-lock braking system works, and a slippery road is detected, the inverter/s or the motor switch unit/s of the vehicle is driven to shift a reverse mode, When being in the reverse mode during braking, and an unwanted trace of the vehicle 1BE, or a turn of the vehicles steering wheel (13) is detected, the inverter/s or the motor switch unit/s of the vehicle is driven to shift from the reverse mode to a forward mode utilizing speed measurement data of the vehicle.

Further, with the electric vehicle without the gears/transmission in order to correct the skidding, the inverter/s or the motor switch unit/s of the vehicle can be driven by the braking control arrangement to shift the reverse mode in order to improve the correction of the skidding.

So, the braking control arrangement according to the invention can be installed in electric vehicles with or without the gears/transmissions and vehicles with combustion engines.

Thus, the inventive provides the braking control arrangement for a braking system of a vehicle 1B, 1C, 1C, 1BE, comprising an anti-lock braking system and an electronic stability control. The braking control arrangement comprises a module 40 that is arranged to operate with the anti-lock braking system and the electric stability control. The arrangement is also arranged to drive the vehicle in such a way that when braking the vehicle and the anti-lock braking system works, and a slippery road is detected, the vehicle is driven to shift a reverse mode, When being in reverse during braking, and an unwanted trace of the vehicle 1B, 1C, 1C, 1BE, or a turn of the vehicles steering wheel 13 is detected, the vehicle is driven to shift from the reverse mode to a forward mode utilizing speed measurement data of the vehicle. Further, the braking control arrangement can also be arranged to drive the vehicle 1B, 1C, 1C, 1BE in such a way that when the electronic stability control works in order to correct skidding, the vehicle is driven to shift the reverse mode in order to improve the correction of the skidding.

As said, the forward mode means that the wheels/wheel is driven to move forward, either using a suitable forward gear or the electric motor running forward. The reverse mode means that the wheels/wheel is driven to move backward, either using a reverse gear or the electric motor running backward.

FIG. 7 shows a flow chart example of an inventive braking control method for a braking system of a vehicle. The braking system comprises an anti-lock braking system and an electronic stability control. The method is arranged to operate with the anti-lock braking system and the electric stability control, the method comprising steps: to drive 71 the vehicle so that when braking the vehicle and the anti-lock braking system works, and a slippery road is detected, the vehicle is driven to shift a reverse mode; and to drive 72 the vehicle back from the reverse mode to a forward mode utilizing speed measurement data of the vehicle, when an unwanted trace of the vehicle or a turn of the vehicles steering wheel is detected. So, it is possible to steer the vehicle, since when turning the steering wheel, the arrangement is shift to the forward mode as said above and the ABS works again.

The method may further comprise a step to drive the vehicle so that when the electronic stability control works in order to correct skidding, the vehicle is driven to shift a reverse mode in order to improve the correction of the skidding.

FIG. 8 shows a flow chart example of an inventive braking control method for a braking system of a vehicle in more detail manner. The braking system comprises an anti-lock braking system and an electronic stability control. The method is arranged to operate with the anti-lock braking system and the electric stability control, the method comprising steps: to drive 51 a gear arrangement of the vehicle, or an inverter/s of the vehicle's electric motor/s, or a motor switch unit/s of the vehicle so that when braking the vehicle and the anti-lock braking system works, and a slippery road is detected, the gear arrangement of the vehicle, or an inverter/s of the vehicle's electric motor/s, or a motor switch unit/s of the vehicle is driven to shift a reverse mode; and to drive 52 the gear arrangement of the vehicle, or an inverter/s of the vehicle's electric motor/s, or a motor switch unit/s of the vehicle back from the reverse mode to a forward mode utilizing speed measurement data of the vehicle, when an unwanted trace of the vehicle or a turn of the vehicles steering wheel is detected. So, its possible to steer the vehicle, since when turning the steering wheel the gear arrangement, or an inverter/s of the vehicle's electric motor/s, or a motor switch unit/s of the vehicle, is shift to the forward mode as said above and the ABS works again.

The method may further comprise a step to drive the gear arrangement of the vehicle or an inverter/s of the vehicle's electric motor/s, or a motor switch unit/s of the vehicle so that when the electronic stability control works in order to correct skidding, the gear arrangement of the vehicle, or an inverter/s of the vehicle's electric motor/s, or a motor switch unit/s of the vehicle is driven to shift a reverse mode in order to improve the correction of the skidding.

A vehicle can be a car, a van, a sport car, a pick-up, or a campervan. So, the invention can be mainly used with relative light vehicles, but heavier vehicles may also be configured to utilize the invention.

It is evident from the above that the invention is not limited to the embodiments described in this text but can be implemented in many other different embodiments within the scope of the independent claims.

The invention claimed is:

1. A braking control arrangement for a braking system of a vehicle, the braking system comprising an anti-lock braking system and an electronic stability control, wherein the braking control arrangement comprises:
   a module arranged to operate with the anti-lock braking system and the electronic stability control,
   wherein the braking control arrangement is also arranged to drive the vehicle in such a way that when braking the vehicle and the anti-lock braking system works, and a slippery road is detected, the vehicle is driven to shift a reverse mode, and wherein, when being in reverse during braking, a turn of a steering wheel of the vehicle is detected, the vehicle is driven to shift from the reverse mode to a forward mode utilizing speed measurement data of the vehicle.

2. The braking control arrangement according to claim 1, wherein the slippery road is detected by utilizing temperature measurement data and deceleration data of the vehicle, so that if the temperature measurement data is below a threshold temperature and the deceleration data of the vehicle reveals that the deceleration of the vehicle is too low, the slippery road is detected.

3. The braking control arrangement according to claim 1, wherein the slippery road is detected by utilizing temperature measurement data and a camera data of a surface of the road, so that if the temperature measurement data is below a threshold temperature and the camera data provides another data than a dry asphalt surface, the slippery road is detected.

4. The braking control arrangement according to claim 1, wherein the braking control arrangement is also arranged to drive the vehicle in such a way that when the electronic stability control works in order to correct skidding, the vehicle is driven to shift the reverse mode in order to improve the correction of the skidding.

5. The braking control arrangement according to claim 4, wherein the braking control arrangement utilizes measurement data from a temperature sensor, speed measurement sensors, a steering wheel angle sensor, a yaw rate sensor, a lateral acceleration sensor and a longitudinal acceleration sensor.

6. The braking control arrangement according to claim 1, wherein the braking control arrangement is arranged to drive a gear arrangement of the vehicle in such a way that when braking the vehicle and the anti-lock braking system works, and the slippery road is detected, the gear arrangement of the vehicle is driven to shift a reverse gear, and wherein when being in reverse gear during braking, and an unwanted trace of the vehicle, or a turn of the vehicles steering wheel is detected, the gear arrangement of the vehicle is driven to shift from the reverse gear to a forward gear utilizing speed measurement data of the vehicle.

7. The braking control arrangement according to claim 6, wherein in order to correct the skidding, the gear arrangement of the vehicle is driven to shift the reverse gear in order to improve the correction of the skidding.

8. The braking control arrangement according to claim 1, wherein the vehicle is an electric vehicle, and the braking control arrangement is arranged to drive an inverter or a motor switch unit of the vehicle in such a way that when braking the vehicle and the anti-lock braking system works, and a slippery road is detected, the inverter or the motor switch unit of the vehicle is driven to shift the reverse mode, and wherein, when being in the reverse mode during braking, and an unwanted trace of the vehicle, or a turn of the steering wheel of the vehicle is detected, the inverter or the motor switch unit of the vehicle is driven to shift from the reverse mode to the forward mode utilizing speed measurement data of the vehicle.

9. The braking control arrangement according to claim 6, wherein in order to correct the skidding, the inverter or the motor switch unit of the vehicle is driven to shift the reverse mode in order to improve the correction of the skidding.

10. The braking control arrangement according to claim 1, wherein the module is software module or an integrated circuit module.

11. The braking control arrangement according to claim 6, wherein the gear arrangement is an automatic transmission of the vehicle.

12. The braking control arrangement according to claim 6, wherein the vehicle is an electric vehicle, and the gear arrangement is a gear system of the electric vehicle.

13. A braking control method for a braking system of a vehicle, the braking system comprising an anti-lock braking system and an electronic stability control, wherein the method is arranged to operate with the anti-lock braking system and the electronic stability control, the method comprising:

driving the vehicle so that when braking the vehicle and the anti-lock braking system works, and a slippery road is detected, the vehicle is driven to shift a reverse mode; and driving the vehicle back from the reverse mode to a forward mode utilizing speed measurement data of the vehicle, when a turn of a steering wheel of the vehicle is detected.

14. The braking control method according to claim 13, further comprising driving the vehicle so that when the electronic stability control works in order to correct skidding, the vehicle is driven to shift the reverse mode in order to improve the correction of the skidding.

15. The braking control method according to claim 12, wherein said driving the vehicle so that when braking the vehicle and the anti-lock braking system works and said driving the vehicle back from the reverse mode to a forward mode are arranged to drive a gear arrangement of the vehicle.

16. The braking control method according to claim 12, wherein said driving the vehicle so that when braking the vehicle and the anti-lock braking system works and said driving the vehicle back from the reverse mode to a forward mode are arranged to drive an inverter or a motor switch unit of the vehicle, the vehicle being an electric car.

* * * * *